United States Patent [19]
Ishihara

[11] Patent Number: 5,142,386
[45] Date of Patent: Aug. 25, 1992

[54] DEVICE AND METHOD FOR REDUCING THE OBSERVABILITY OF A DEFECTIVE PIXEL IN AN LCD

[75] Inventor: Shuji Ishihara, Tokyo, Japan

[73] Assignee: NEC Corporation, Tokyo, Japan

[21] Appl. No.: 540,204

[22] Filed: Jun. 19, 1990

[30] Foreign Application Priority Data

Jun. 19, 1989 [JP] Japan ................... 1-157621

[51] Int. Cl.$^5$ ............................................. G02F 1/13
[52] U.S. Cl. ........................................ 359/45; 359/58; 359/67; 359/68
[58] Field of Search ............... 350/339 F, 339 R, 351, 350/333; 340/784; 359/45, 58, 67, 68

[56] References Cited

U.S. PATENT DOCUMENTS

| | | |
|---|---|---|
| 3,938,140 | 2/1976 | Garcia et al. |
| 4,301,450 | 11/1981 | Smoliar |
| 4,368,523 | 1/1983 | Kawate |
| 4,630,893 | 12/1986 | Credelle et al. ............. 350/334 |
| 4,666,252 | 5/1987 | Yaniv et al. ............. 359/60 X |
| 4,775,861 | 10/1988 | Saito |

FOREIGN PATENT DOCUMENTS

| | | |
|---|---|---|
| 60-66231 | 4/1985 | Japan |
| 60-97322 | 5/1985 | Japan |
| 60-243635 | 12/1985 | Japan |

*Primary Examiner*—Stanley D. Miller
*Assistant Examiner*—Ron Trice
*Attorney, Agent, or Firm*—Burns, Doane, Swecker & Mathis

[57] ABSTRACT

An active matrix liquid crystal display panel is composed of a number of liquid crystal display elements arranged in the form a matrix, each of the liquid crystal display elements being composed of an individual display electrode, a common electrode, and a liquid crystal material sandwiched between the individual display electrode and the common electrode. The individual display electrode of each of the liquid crystal display elements is selectively activated through an associated active element. A liquid crystal display element connected to a defective active element is modified by burning the associated color filter and/or heating the liquid crystal to render the liquid crystal translucent to become a half tone display element, so that the liquid crystal display element connected to the defective active element becomes overshadowed or inconspicuous when the display panel is in operation.

7 Claims, 2 Drawing Sheets

DEVICE AND METHOD FOR REDUCING THE OBSERVABILITY OF A DEFECTIVE PIXEL IN AN LCD

BACKGROUND OF THE INVENTION

1. Field of the Invention

The present invention relates to an active matrix liquid crystal display panel which is used in for example a liquid crystal display television receiver, and a method for manufacturing the active matrix liquid crystal display panel. More specifically, the present invention relates to a method for compensating a defective pixel in the active matrix liquid crystal display panel, and the active matrix liquid crystal display panel having the compensated defective pixel.

2. Description of the Related Art

Active matrix liquid crystal display panels having a high resolution have been composed of several hundreds thousand pixels, and therefore, a high degree of technique has been required in order to manufacture a defectless active matrix liquid crystal display panel. In addition, the production yield is very low, and it has been necessary to repair defective portions.

In the prior art, one countermeasure for the above mentioned problems has been that two active elements are provided in parallel to each other for each one pixel, so that, on one hand, possibility of an open circuit of a circuit associated to each one pixel is reduced to a half, and on the other hand, when a short-circuit occurs in one active element, a current can be applied to the short-circuited active element so as to burn out the short-circuited active element into an permanent open circuit.

However, the above mentioned countermeasure has been disadvantageous in that since two active elements have to be provided for each one pixel, the number of required active elements becomes double, and therefore, possibility of defective active elements also becomes double. In addition, although more expensive manufacturing equipments have been used in order to further miniaturize each active elements, the above mentioned countermeasure has been not so effective. Further, if both of the two active elements provided for one pixel are defective, it is no longer been possible to repair.

SUMMARY OF THE INVENTION

Accordingly, it is an object of the present invention to provide a defective pixel compensating method which has overcome the above mentioned defect of the conventional one.

Another object of the present invention is to provide a method for compensating a defective pixel in the active matrix liquid crystal display panel, which method can be performed at a low cost, and which method does not require an increase of the number of active elements, and hence, further miniaturization of the active elements, with the result that the production yield of the active matrix liquid crystal display panels are improved.

Still another object of the present invention is to provide an active matrix liquid crystal display panel in which a defective pixel is compensated without increasing the number of active elements.

The above and other objects of the present invention are achieved in accordance with the present invention by a method for compensating a defective pixel in an active matrix liquid crystal display panel composed of a number of liquid crystal display elements arranged in the form a matrix, each of the liquid crystal display elements being composed of an individual display electrode, a common electrode and a liquid crystal material sandwiched between the individual display electrode and the common electrode, the individual display electrode of each of the liquid crystal display elements being selectively activated through an associated active element, the method comprising the step of modifying a liquid crystal display element connected to a defective active element into a half tone display element, whereby the liquid crystal display element connected to the defective active element becomes overshadowed when the display panel is in operation. For example, each of the active elements can be formed of TFT (thin film transistor) or MIM (metal-insulator-metal) diode.

In a specific embodiment, each of liquid crystal display elements includes an individual color filter located between the liquid crystal material and the common electrode, and the modification of the liquid crystal display element is executed by irradiating a laser light into the color filter of the liquid crystal display element connected to the defective active element so that the color of the color filter is changed into gray which is at a mid-point tone between white and black.

Alternatively, the modification of the liquid crystal display element is executed by applying heat into an individual display electrode of the liquid crystal display element connected to the defective active element so that a portion of the liquid crystal material sandwiched between the heated individual display electrode and the common electrode has a disturbed orientation, whereby the portion of the liquid crystal material is rendered translucent so that the liquid crystal display element connected to the defective active element gives a gray which is at a mid-point tone between white and black.

The heating of the individual display electrode is executed by applying to the defective active element, a voltage sufficient to heat the defective active element and hence the liquid crystal display element connected to the defective active element.

In addition, the modification of the liquid crystal display element is executed by applying heat into a crystal display material portion of the liquid crystal display element connected to the defective active element so that the liquid crystal material portion has a disturbed orientation whereby the liquid crystal material portion is rendered translucent. The heating of the crystal display material portion of the liquid crystal display element connected to the defective active element is executed by applying to the liquid crystal display element connected to the defective active element, a laser beam of sufficient to heat the crystal display material portion of the liquid crystal display element connected to the defective active element.

In a preferred embodiment, an active matrix liquid crystal display panel includes a number of signal lines, a number of scan lines intersecting the signal lines to cooperate with the signal lines so as to form a matrix, a number of driving thin film field effect transistors arranged in the form of a matrix and positioned one by one at intersecting points between the signal lines and the scan lines, each of the driving thin film field effect transistors having a gate connected to one of the scan lines and a drain connected to one of the signal lines, and a number of liquid crystal display elements each having an individual display electrode, a common electrode opposing the individual display electrode, and a liquid crystal material between the individual display electrode and the common electrode, the individual display electrode of each of the liquid crystal display elements being connected to a source of a corresponding driving thin film field effect transistor so that the liquid crystal display elements are selectively driven by the associated driving thin film field effect transistors. The method in accordance with the present invention for compensating a defective pixel in the above mentioned active matrix liquid crystal display panel is performed by modifying a liquid crystal display element connected to a defective driving thin film field effect transistor into a half tone display element, whereby the liquid crystal display element connected to the defective driving thin film field effect transistor becomes inconspicuous when the display panel is in operation.

According to another aspect of the present invention, there is provided an active matrix liquid crystal display panel composed of a number of liquid crystal display elements arranged in the form a matrix, each of the liquid crystal display elements being composed of an individual display electrode, a common electrode and a liquid crystal material sandwiched between the individual display electrode and the common electrode, the individual display electrode of each of the liquid crystal display elements being selectively activated through an associated active element, wherein a liquid crystal display element connected to a defective active element is modified to give a half tone, whereby the liquid crystal display element connected to a defective active element becomes overshadowed when the display panel is in operation.

In one embodiment, the liquid crystal display element connected to a defective active element is modified to give a gray which is at a midpoint tone between white and black.

In a specific embodiment, each of liquid crystal display elements includes an individual color filter located between the liquid crystal material and the common electrode, and the color filter of the liquid crystal display element connected to the defective active element is modified to give a gray which is at a mid-point tone between white and black.

In another embodiment, a crystal display material portion of the liquid crystal display element connected to the defective active element has a disturbed orientation whereby the liquid crystal material portion is rendered translucent so that the liquid crystal display element connected to the defective active element gives a gray which is at a mid-point tone between white and black.

The above and other objects, features and advantages of the present invention will be apparent from the following description of preferred embodiments of the invention with reference to the accompanying drawings.

DESCRIPTION OF THE PREFERRED EMBODIMENTS

Figure 1:
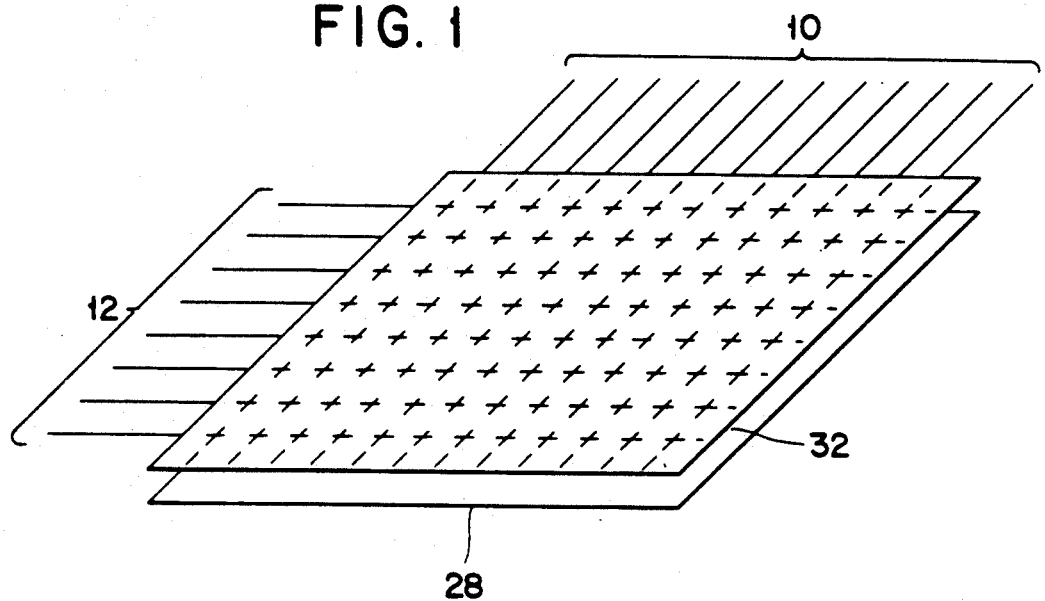
FIG. 1 is a conceptional diagram of an active matrix liquid crystal display panel for illustrating one embodiment of the method in accordance with the present invention.

Referring to FIG. 1, there is shown a conceptional diagram of an active matrix liquid crystal display panel for illustrating one embodiment of the method in accordance with the present invention. The shown active matrix liquid crystal display panel is a TFT (thin film transistor) color active matrix liquid crystal display panel.

The shown active matrix liquid crystal display panel comprises a number of horizontal drive lines or signal lines 10, and a number of vertical drive lines or scan lines 12 intersecting the signal lines 10 to cooperate with the signal lines 10 so as to form a matrix. On each of intersecting points between the signal lines 10 and the scan lines 12, one pixel is formed.

Figure 2:
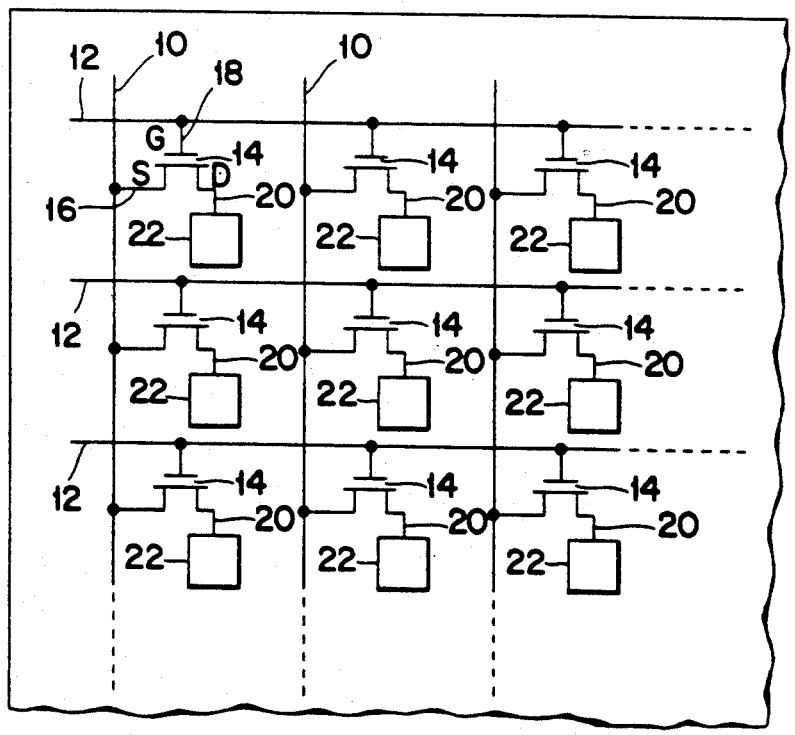
FIG. 2 is a circuit diagram of the active matrix liquid crystal display panel shown in FIG. 1.

Namely, on each of the intersecting points between the signal lines 10 and the scan lines 12, one TFT transistor 14 is formed, which includes a source 16 connected to a corresponding signal line 10, a gate 18 connected to a corresponding scan line 12 and a drane 20 connected to a corresponding individual or pixel transparent electrode 22, as shown in FIG. 2.

Figure 3:
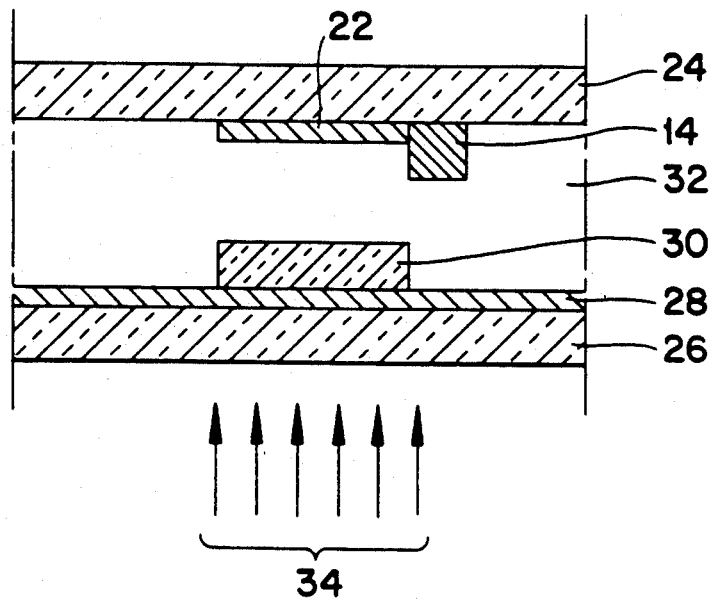
FIG. 3 is a diagrammatic sectional view of one pixel portion of the active matrix liquid crystal display panel shown in FIG. 1.

As shown in FIG. 3, the pixel transparent electrode 22 is deposited on an inside surface of an encapsulating glass plate 24 and has a rubbed surface, and the TFT transistor 14 connected to the pixel transparent electrode 22 is located on the inside surface of the encapsulating glass plate 24 adjacent to the pixel transparent electrode 22. In opposition to the encapsulating glass plate 24, another encapsulating glass plate 26 is provided, and a common transparent electrode 28 is formed on an inside surface of the encapsulating glass plate 26. On a surface of the common transparent electrode 28, an individual color filter 30 is deposited to face to a corresponding pixel transparent electrode 22. A liquid crystal material 32 is filled in a space between the pair of encapsulating glass plates 24 and 26 so that the liquid crystal material 32 is in contact with the rubbed surface of each pixel transparent electrode 22 and has an aligned molecular orientation defined by the rubbing direction of the rubbed surface. With this, one pixel is formed.

The above mentioned active matrix liquid crystal display panel is the same as the conventional one, and therefore, can be manufactured in a method known to persons skilled in the art. Therefore, explanation of the manufacturing method will be omitted.

In the active matrix liquid crystal display panel manufactured in a method known to persons skilled in the art, assume that one pixel is defective because the associated TFT transistor is inoperative. In this case, a laser beam 34 is irradiated to the defective pixel as shown in FIG. 3, so that the color filter 30 is burned and blackened. In addition, the rubbed surface of the individual transparent electrode 22 is heated by the irradiated laser beam 34, and therefore, disturbed by heat, so that the molecular orientation of the liquid crystal in contact with the disturbed rubbed surface of the individual transparent electrode 22 is also disturbed. Light transparency of this orientation-disturbed portion of the liquid crystal is decreased. This disturbance of the molecular orientation of the liquid crystal will not be returned to the aligned condition even if the liquid crystal is cooled.

With the blackening of the color filter 30 and/or the disturbance of the molecular orientation of the liquid crystal will cause the defective pixel to have a gray color, preferably, a mid-point tone between white and black.

Alternatively, heating of a portion of the liquid crystal 32 between the individual transparent electrode 22 connected to the inoperative TFT transistor and the opposite color filter 30 can be performed by electrically heating the individual transparent electrode 22.

Figure 4:
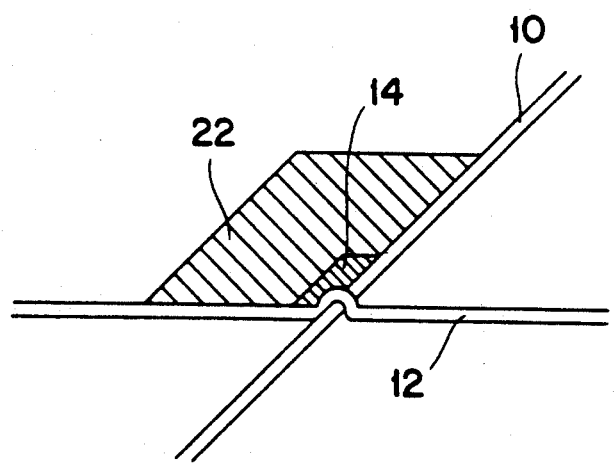
FIG. 4 is a conceptional perspective view of one pixel portion of an active matrix liquid crystal display panel for illustrating another embodiment of the method in accordance with the present invention.

As seen from FIG. 4, the electrical heating of the individual transparent electrode 22 can be performed by applying an excessive voltage between a signal line 10 and a scan line 12 which are connected to the inoperative TFT transistor, so that the drain-gate of the inoperative TFT transistor is broken down by the excessive voltage, and therefore, the inoperative TFT transistor and hence the pixel electrode 22 connected therewith are heated. As a result, the liquid crystal portion in contact with the heated pixel electrode 22 is heated to disturb the orientation of liquid crystal. As mentioned above, light transparency of this orientation-disturbed portion of the liquid crystal is decreased. In this case, even if the inoperative TFT transistor is destroyed by the excessive voltage, it becomes no problem, since the TFT transistor cannot already drive the associated pixel.

In any case, a required energy amount of the irradiated laser and a required voltage applied to the inoperative TFT transistor are dependent upon various conditions such as the property of the transparent electrode, the thickness of the liquid crystal, the size of the pixel, and others, and therefore, cannot be simply determined. Therefore, the necessary energy amount of the irradiated laser and the necessary applied voltage are determined or controlled to an optimum value, while observing the blackened condition of the color filter of a defective pixel or while observing disturbance of the liquid crystal molecular orientation of a defective pixel, so that the defective pixel will give a fixed gray level which is a mid-point tone between white and black.

With the above mentioned treatment, the defective pixel is modified to give a fixed gray tone and therefore becomes inconspicuous under an actual use when the active matrix liquid crystal display panel is actually in operation.

As seen from the above mentioned description of the embodiments, the method of the present invention is characterized in that a defective pixel of the active matrix liquid crystal display panel manufactured is modified to give a fixed halftone and therefore to become inconspicuous. This is more practical and more effective than provision of two active elements for each one pixel, since a high degree of lithography for miniaturization of active elements is not required, and since the production yield of the active matrix liquid crystal display panels can be improved so as to lower the production cost.

The invention has thus been shown and described with reference to the specific embodiments. However, it should be noted that the present invention is in no way limited to the details of the illustrated structures but changes and modifications may be made within the scope of the appended claims.

I claim:

1. A method for compensating a defective pixel in an active matrix liquid crystal display panel comprising
a number of liquid crystal display elements arranged in the form of a matrix, each of the liquid crystal display elements including
an individual display electrode,
a common electrode,
a liquid crystal material sandwiched between said individual display electrode and said common electrode, and
an individual color filter located between the liquid crystal material and said common electrode,
the individual display electrode of each of the liquid crystal display elements being selectively activated through an associated active element,
the method comprising the step of burning a color filter of a liquid crystal display element connected to a defective active element so that the color of said color filter is changed to a gray tone which is at a mid-point tone between white and black, whereby the liquid crystal display element connected to the defective active element becomes a half tone display element when the display panel is in operation.

2. A method claimed in claim 1 wherein the burning of the color filter of the liquid crystal display element is executed by irradiating a laser light into the color filter of the liquid crystal display element connected to the defective active element.

3. A method for compensating a defective pixel in an active matrix liquid crystal display panel comprising
a number of liquid crystal display elements arranged in the form of a matrix, each of the liquid crystal display elements including
an individual display electrode,
a common electrode,
a liquid crystal material sandwiched between said individual display electrode and said common electrode, and
an individual color filter located between the liquid crystal material and said common electrode,
the individual display electrode of each of the liquid crystal display elements being selectively activated through an associated active element,
the method comprising the step of burning a color filter of a liquid crystal display element connected to a defective active element and applying heat into a crystal display material portion of the liquid crystal display element connected to the defective active element, so that the color of said color filter is changed into a gray and said liquid crystal material portion has a disturbed orientation whereby said liquid crystal material portion is rendered translucent, so that the liquid crystal display element connected to the defective active element becomes a half tone display element when the display panel is in operation.

4. A method claimed in claim 3 wherein the heating of said crystal display material portion of the liquid crystal display element connected to the defective active element is executed by applying to the liquid crystal display element connected to the defective active element, a laser beam sufficient to heat said crystal display material portion of the liquid crystal display element connected to the defective active element.

5. An active matrix liquid crystal display panel comprising
a number of liquid crystal display elements arranged in the form of a matrix, each of the liquid crystal display elements including an individual display electrode,
a common electrode,
a liquid crystal material sandwiched between said individual display electrode and said common electrode, and
an individual color filter located between said liquid crystal material and said common electrode, the individual display electrode of each of the liquid crystal display elements being selectively activated through an associated active element, wherein the color filter of a liquid crystal display element connected to a defective active element is burned to give a gray which is at a midpoint tone between white and black, whereby the liquid crystal display element connected to a defective active element becomes a half tone element, when the display panel is in operation.

6. An active matrix liquid crystal display panel comprising
a number of liquid crystal display elements arranged in the form of a matrix, each of the liquid crystal display elements including
an individual display electrode,
a common electrode,
a liquid crystal material sandwiched between said individual display electrode and said common electrode, and
an individual color filter located between the liquid crystal material and said common electrode,
the individual display electrode of each of the liquid crystal display elements being selectively activated through an associated active element, wherein a color filter of a liquid crystal display element connected to a defective active element and a crystal display material portion of the liquid crystal display element connected to the defective active element are burnt so that the color of said color filter gives a gray and said crystal display material portion of the liquid crystal display element connected to the defective active element has a disturbed orientation whereby said liquid crystal material portion is rendered translucent, so that the liquid crystal display element connected to the defective active element gives a a half tone display element when the display panel is in operation.

7. A method for compensating a defective pixel in an active matrix liquid crystal display panel which includes
a number of signal lines,
a number of scan lines intersecting the signal lines to cooperate with the signal lines so as to form a matrix,
a number of driving thin film field effect transistors arranged in the form of a matrix and positioned one by one at intersecting points between the signal lines and the scan lines, each of the driving thin film field effect transistors having a gate connected to one of the scan lines and a source connected to one of the signal lines, and
a number of liquid crystal display elements each having an individual display electrode, a common electrode opposing the individual display electrode, a liquid crystal material between the individual display electrode the common electrode, and an individual color filter located between said liquid crystal material and said common electrode, the individual display electrode of each of the liquid crystal display elements being connected to a drain of a corresponding driving thin film field effect transistor so that the liquid crystal display elements are selectively driven by the associated driving thin film field effect transistors,
the method comprising the step of burning the color filter of a liquid crystal display element connected to a defective driving thin film field effect transistor so as to give a gray tone which is at a midpoint tone between white and black, whereby the liquid crystal display element connected to the defective driving thin film field effect transistor becomes a half tone element, when the display panel is in operation.

* * * * *